United States Patent [19]
Cudnohufsky

[11] 4,261,130
[45] Apr. 14, 1981

[54] RELEASABLE MECHANISM FOR FISHING LINE
[76] Inventor: Sylvester R. Cudnohufsky, 5050 Ferry Rd., P.O. Box 582, East Jordan, Mich. 49727
[21] Appl. No.: 97,396
[22] Filed: Nov. 26, 1979
[51] Int. Cl.³ .............................................. A01K 91/06
[52] U.S. Cl. .................................................. 43/43.12
[58] Field of Search ................... 43/27.2, 27.4, 43.1, 43/43.12

[56] References Cited
U.S. PATENT DOCUMENTS

| | | | |
|---|---|---|---|
| 3,800,458 | 4/1974 | Swanby | 43/43.12 |
| 3,835,573 | 9/1974 | Borchardt | 43/43.12 |
| 3,930,330 | 1/1976 | Black | 43/43.12 X |
| 3,961,437 | 6/1976 | Lewis | 43/43.12 X |
| 3,974,589 | 8/1976 | Henze et al. | 43/43.12 |
| 4,012,863 | 3/1977 | Lori | 43/43.12 |
| 4,069,611 | 1/1978 | Dusich | 43/43.12 |
| 4,173,091 | 11/1979 | Emory | 43/43.12 |

*Primary Examiner*—Nicholas P. Godici
*Assistant Examiner*—Robert P. Olszewski
*Attorney, Agent, or Firm*—Barnes, Kisselle, Raisch & Choate

[57] ABSTRACT

A device for releasably gripping a fishing line employed in conjunction with a downrigger device consists of a bracket attached to the downrigger device and having a lever connected therewith for pivotal movement in a vertical plane. An intermediate portion of the line extending down from the fishing rod is releasably connected to the bracket by means of the lever. A pull of predetermined strength on the trailing bait end portion of the line extending rearwardly from the bracket is designed to pivot the lever upwardly. The line is released from the bracket in response to upward pivotal movement of the lever.

16 Claims, 17 Drawing Figures

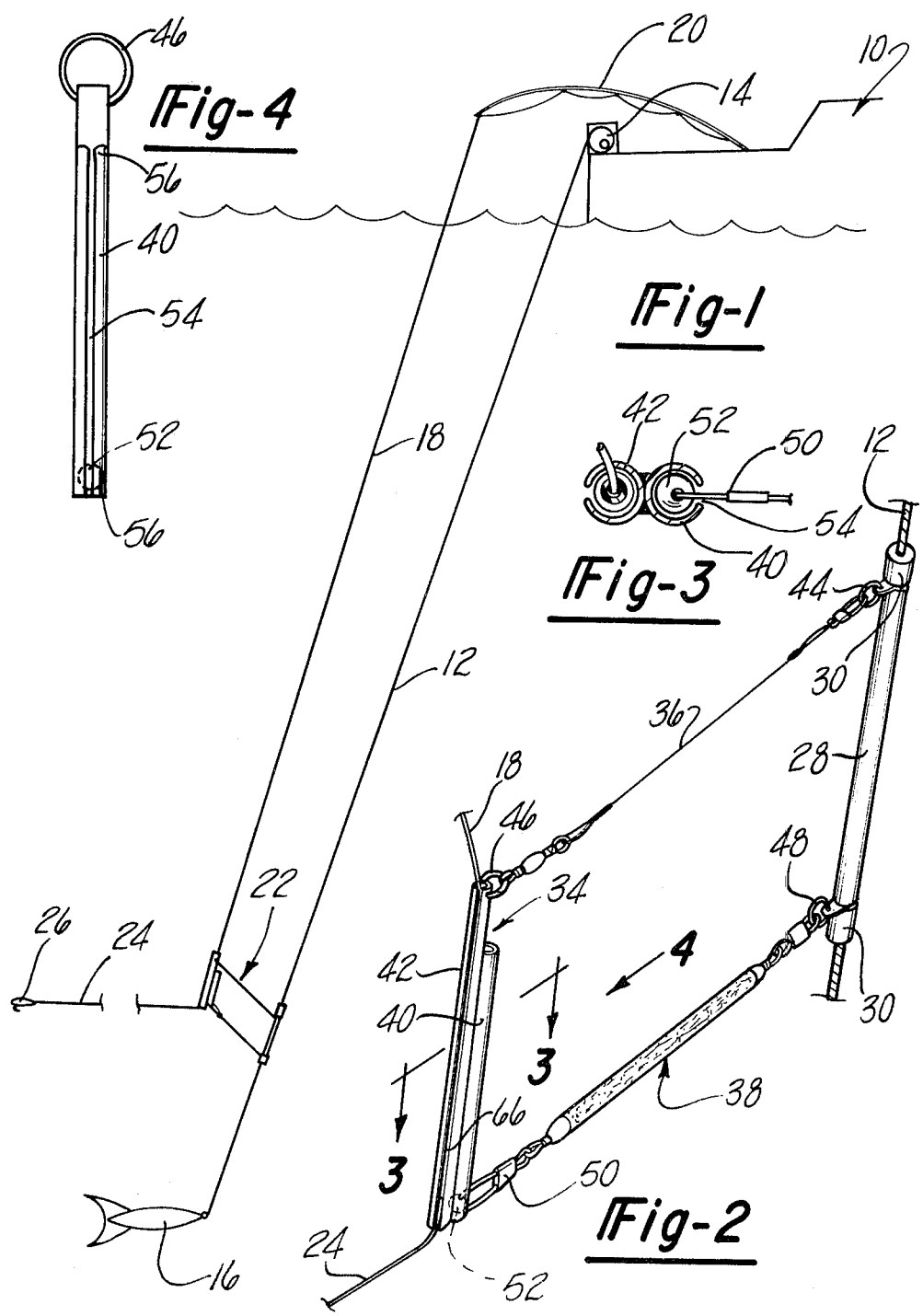

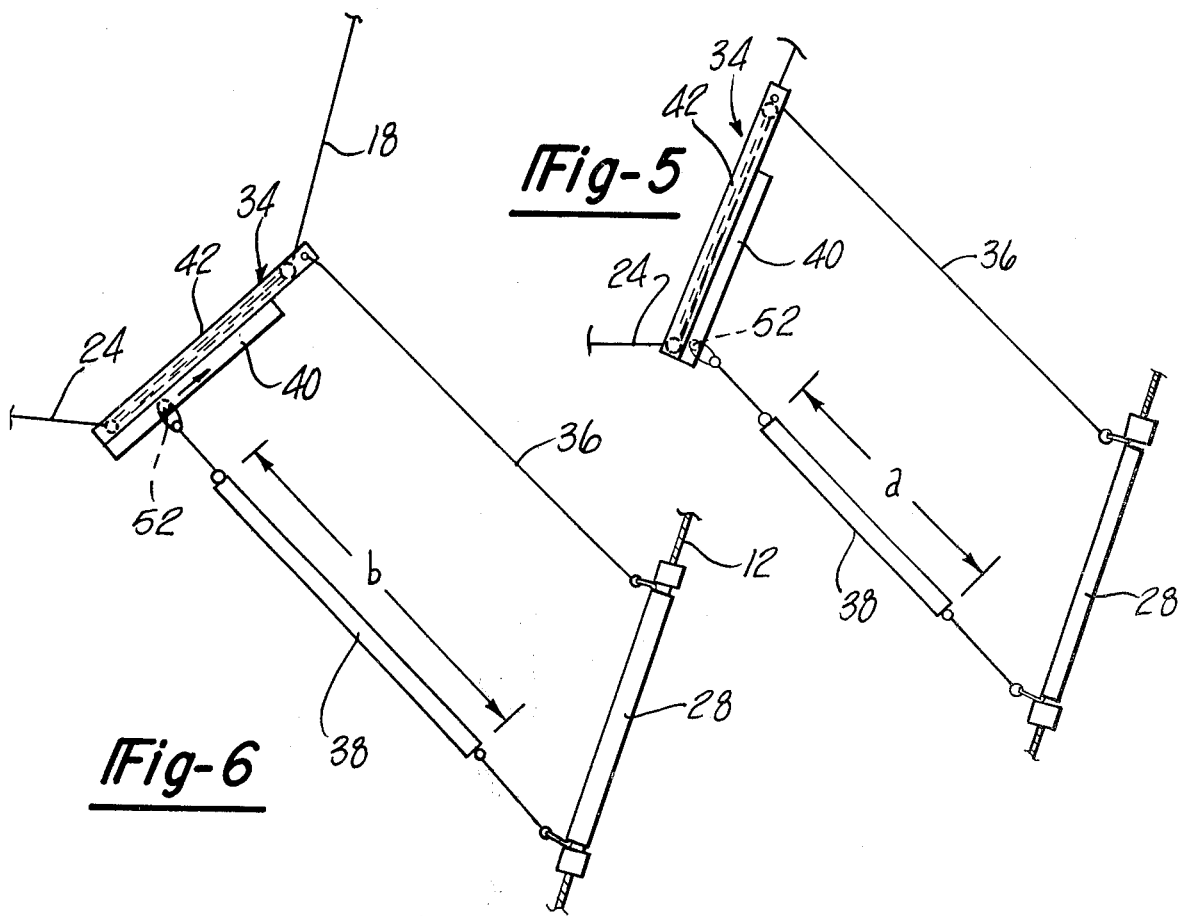
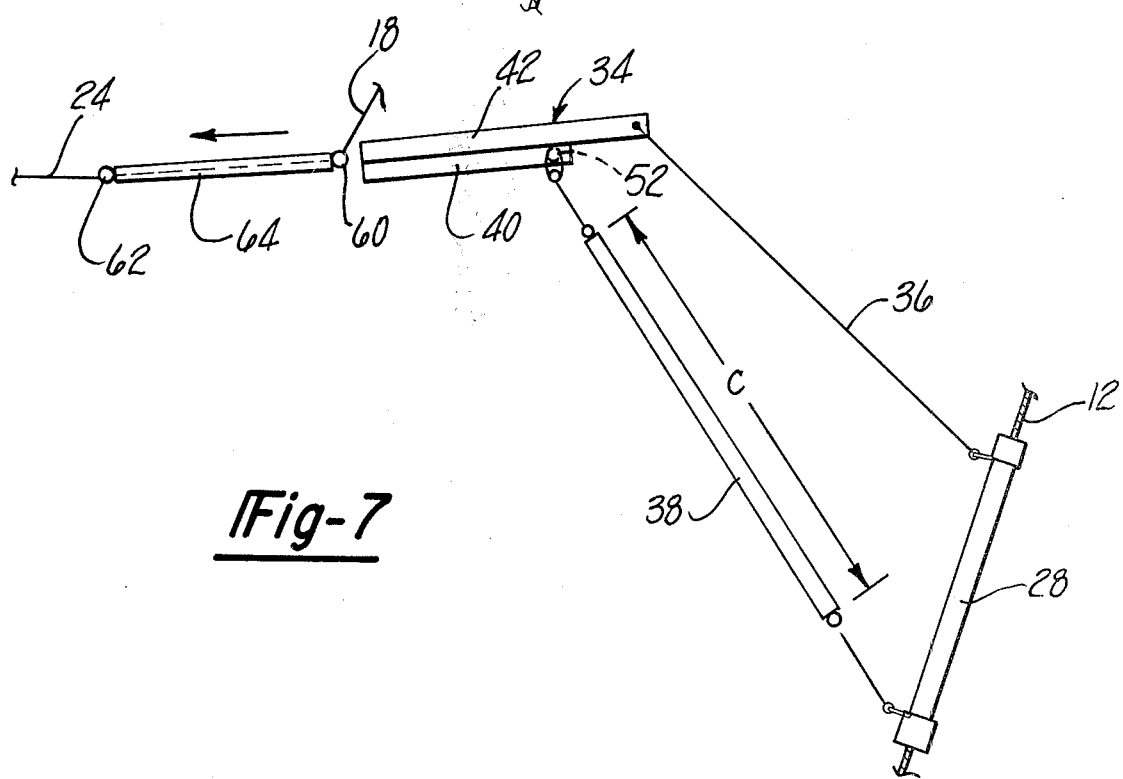

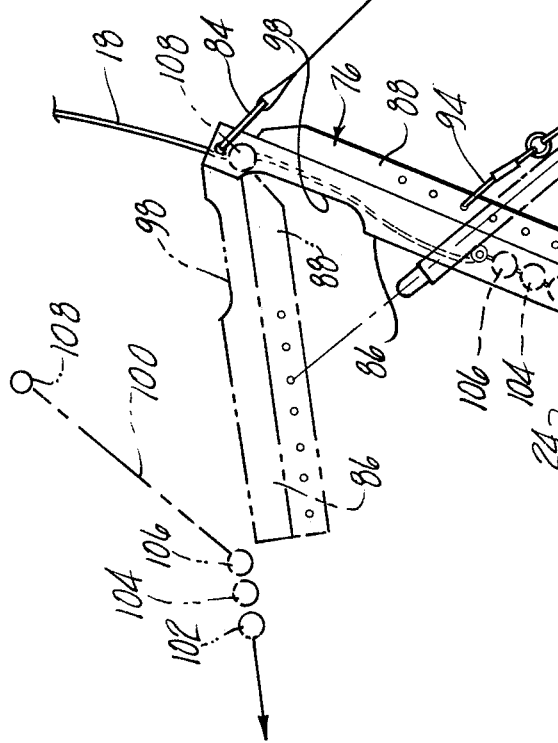
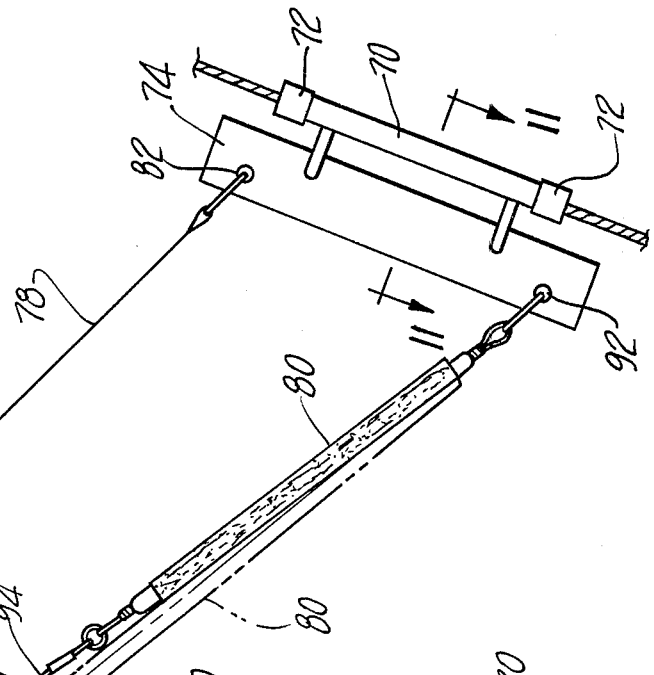
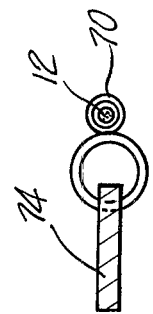
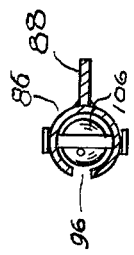
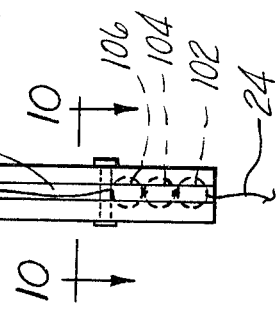

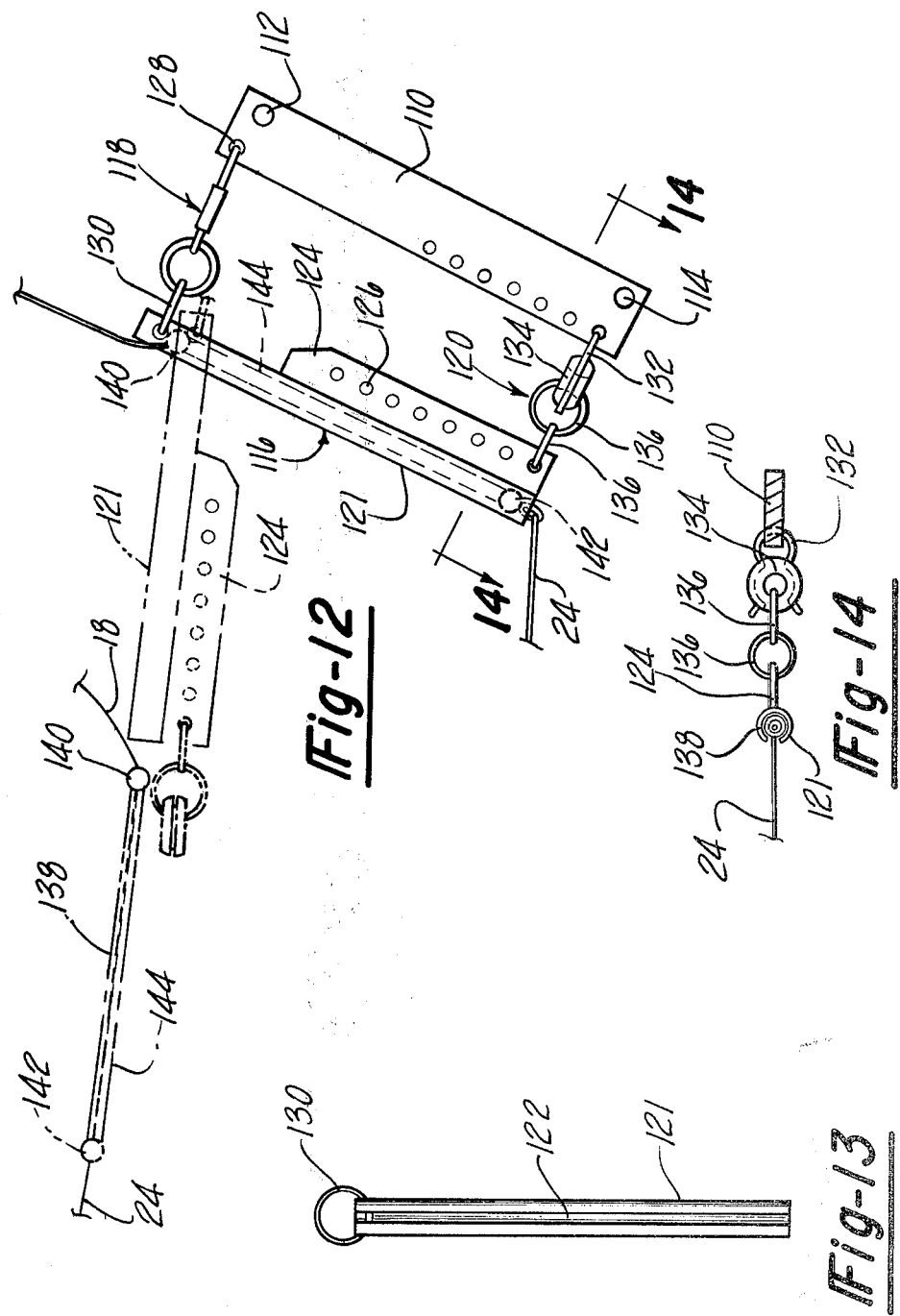

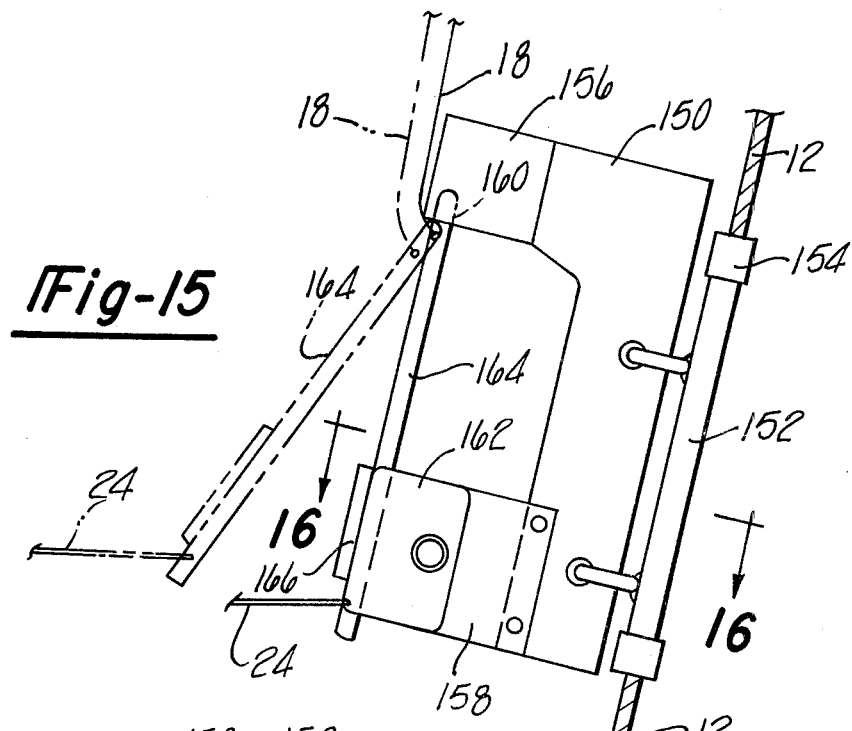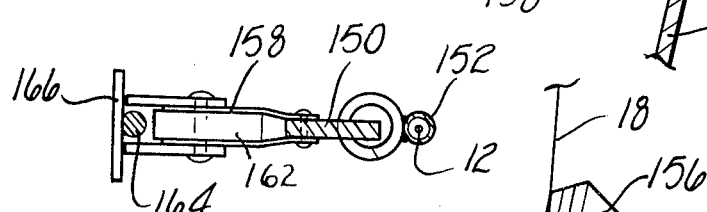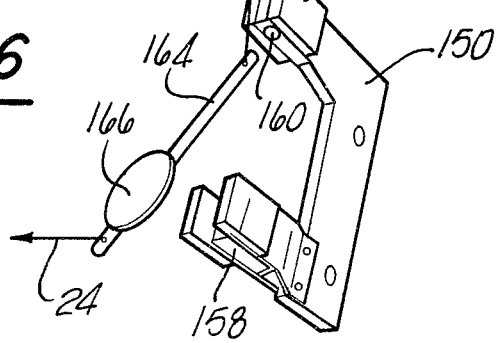

RELEASABLE MECHANISM FOR FISHING LINE

This invention relates to a release mechanism for a fishing line used in conjunction with a downrigger device.

When trolling in relatively deep water a downrigger device is frequently employed to maintain the bait on the fishing line at a desired underwater depth. A downrigger device normally comprises a relatively heavy weight attached to the lower end of a winch-operated cable. The line from the fishing rod has a live or artificial bait on its end and is releasably connected to the downrigger weight or to the downrigger cable at a section thereof spaced some selected distance from the bait. When the fishing line is so arranged, the portion of the line extending between the downrigger device and the bait is pulled horizontally through the water at the desired depth. When trolling with a downrigger device in this manner it is essential that the fishing line be released from the downrigger device (the weight or downrigger cable) as soon as a fish strikes the bait. This enables the fish to be reeled in without reeling in the downrigger. The means usually employed for releasably attaching a fishing line to a downrigger device involves a spring biased line engaging mechanism which frictionally grips the line and releases it automatically when the tension on the fishing line exceeds a predetermined value determined by the setting of the spring bias on the line engaging device.

The portion of the fishing line extending between the rod and the downrigger device is inevitably subjected to a considerable amount of drag as it is pulled through the water. The amount of water drag on the portion of the line between the fishing rod and the releasable line engaging device depends upon the amount of line in the water and the extent to which the line bows or arches in a rearward direction between the rod and the release mechanism. With a conventional release mechanism the portion of the line between the rod and the release mechanism cannot be stretched tightly because the resulting tension would exceed the desired line releasing tension of the release mechanism. Therefore, unless the line release mechanism is designed to release the line independently of the force produced by the water drag or the tension on the line between the rod and the release mechanism, it follows that the line must be gripped by the release mechanism to a degree such that only a strike by a relatively large fish would release the line from the downrigger when trolling at normal trolling speed.

Although several devices have been proposed heretofore for attaching a fishing line to a downrigger in a manner such that a strike by even a small fish will release the line somewhat independently of the water drag on the line, such devices have not enjoyed commercial acceptance. For the most part the devices heretofore proposed are of complicated construction, unreliable in operation and costly to manufacture.

The present invention has for its primary object the provision of a release mechanism for a downrigger-attached fishing line which is adapted to release the line from the downrigger device in response to a pull of a desired amount on the bait irrespective of the amount of water drag on the portion of the line extending down from the rod to the line release mechanism.

A further object of the invention is to provide a release mechanism of the type described which enables the line to be stretched relatively tight between the rod and the release mechanism so as to give an immediate visual indication when a fish strikes the bait.

More specifically, the line release mechanism of this invention is characterized by a bracket adapted to be attached to the downrigger device in a generally vertically oriented position and a generally vertically extending lever on the bracket for releasably attaching an intermediate portion of the line extending downwardly from the fishing rod to the bracket. The upper end of the lever is connected to the bracket for pivotal movement in a direction upwardly and rearwardly about a horizontal axis and the lower end of the lever is yieldably connected to the bracket to permit such pivotal movement only when the tension on the bait trailing end portion of the line exceeds a predetermined minimum value. The device is adapted to release the line completely from the bracket only when the lever pivots upwardly and rearwardly to a generally horizontal position.

Other objects, features and advantages of the present invention will become apparent from the following description and accompanying drawings, in which:

FIG. 1 is a view generally illustrating the manner in which the line release mechanism of this invention may be employed in conjunction with a downrigger device;

FIG. 2 is a perspective view of one form of line releasing mechanism according to the present invention;

FIG. 3 is a sectional view along the line 3—3 in FIG. 2;

FIG. 4 is a view of a portion of the device shown in FIG. 2 in the direction of arrow 4;

FIGS. 5, 6 and 7 are views illustrating progressively the manner in which the fishing line is released from the line release device shown in FIG. 2;

FIG. 8 is a side elevational view of a second embodiment of line release mechanism according to the present invention and showing in broken lines the manner in which the fishing line is released therefrom;

FIG. 9 is a rear elevational view of the device shown in FIG. 8;

FIG. 10 is a sectional view along the line 10—10 in FIG. 9;

FIG. 11 is a sectional view along the line 11—11 in FIG. 8;

FIG. 12 is a side elevational view of a third embodiment of the invention and showing in broken lines the manner in which the fishing line is released therefrom;

FIG. 13 is a rear elevational view of the device shown in FIG. 12;

FIG. 14 is a sectional view along the line 14-14 in FIG. 12;

FIG. 15 is a side elevational view of a fourth embodiment of line release mechanism according to the present invention and showing in broken lines the manner in which the fishing line is released therefrom;

FIG. 16 is a sectional view along the line 16—16 in FIG. 15;

FIG. 17 is a perspective view showing the device of FIG. 15 with the fishing line being released therefrom.

Referring to FIG. 1, a conventional downrigger trolling arrangement is illustrated in connection with a boat 10. Downrigger cable 12 extends from a winch or reel 14 on the boat and has a downrigger weight 16 attached to its lower end. A typical downrigger weight 16 may weigh on the order of ten to twelve pounds. The fishing line 18 extends downwardly from a fishing rod 20 to the line release mechanism 22 of the present invention to which it is attached. The trailing portion 24 of the line has a live or artifical bait 26 connected thereto. With the arrangement shown in FIG. 1, as the boat travels forwardly through the water at the desired trolling speed, cable 12 and the portion 18 of the fishing line are inclined vertically to a degree depending upon the speed of the boat and the weight of the downrigger weight 16. The bait trailing portion 24 of the line extends generally horizontally rearwardly from the release mechanism 22.

The release mechanism 22 comprises a bracket in the form of a sleeve 28 through which downrigger cable 12 extends. Sleeve 28 is retained at the desired depth on cable 12 by a pair of stops 30 releasably secured to cable 12. A lever 34 is connected to sleeve 28 by means of upper and lower links 36, 38, respectively. Lever 34 comprises a pair of sleeves 40, 42 which are secured together lengthwise in back-to-back relation. The upper link 36 comprises a thin wire cable connected to the upper end of sleeve 28 as at 44. The rear end of cable 36 is connected to the upper end of sleeve 42 by a ring 46 which extends through the sleeve. The lower link 38 comprises an elastic member which, at its front end, it connected to the lower end of sleeve 28 as at 48. The rear end of elastic member 38 has a swivel connector 50 connected therewith. Connector 50 extends through a small bearing ball 52 slidably arranged within sleeve 40. Sleeve 40 is slotted lengthwise at the front side thereof as at 54 to accommodate swivel 50. The upper and lower ends of sleeve 40 are crimped as at 56 to retain bearing ball 52 within the sleeve.

At a desired distance from the bait 26 (preferably about six to eight feet) there is crimped to the fishing line a pair of bearing balls 60, 62 with a plastic tube 64 extending therebetween (FIG. 6). The bearing balls 60, 62 are spaced apart a distance somewhat less than the length of sleeve 42 and are sized to be slidably received within sleeve 42. The rear side of sleeve 42 is slotted lengthwise as at 66, the width of the slot being substantially less than the diameter of the bearing balls 60, 62 and the diameter of tube 64. However, the width of slot 66 is sufficient to enable the portion 18 of the line to pass radially therethrough. The intermediate portion of the line, that is, the portion of the line extending between the balls 60, 62, is adapted to be engaged with lever 34 by inserting this portion of the line upwardly through the lower end of tube 42 until the upper ball 60 engages the ring 46 which connects the upper link 36 with the upper end of the lever.

In using the release mechanism shown in FIGS. 1 through 7, bracket 28 is first attached to cable 12 at the desired distance from weight 16. It will be appreciated, of course, that bracket 28 can be designed so as to be attached directly to the weight if desired. In any event, after the bracket 28 is attached to the downrigger device, the intermediate portion of the line is connected with lever 34 by sliding the balls 60, 62 and the tube 64 extending therebetween upwardly into sleeve 42 to a position wherein the upper ball 60 abuts ring 46. After the line is attached to lever 34 in this manner both the cable 12 and the fishing line 18 are reeled out simultaneously until weight 16 is at the desired underwater depth. This operation may be performed while the boat is moving forwardly at the desired trolling speed. Thereafter the fishing line is preferably reeled in slightly so that the line 18 is taut and the fishing rod 20 is at least slightly bowed so as to apply tension to the line 18. The two links 36, 38 are normally of about the same length and therefore form a parallel linkage connection between sleeve 28 and lever 34. Thus, the tension on the portion 18 of the line extending downwardly from the rod exerts a direct upward pull on lever 34 by reason of the interengagement of the upper ball 60 with ring 46. As this tension is increased it merely causes lever 34 to swing upwardly into closer parallel relation to cable 12 but does not tend to stretch the elastic member 38.

Referring now specifically to FIG. 5, in the normal trolling position the trailing portion 24 of the line extends generally horizontally rearwardly from the lower end of sleeve 42. Lever 34 is generally parallel to sleeve 28 and is located at least slightly above sleeve 28 depending upon the degree of tension in line 18. The two links 36, 38 incline upwardly and rearwardly in generally parallel relation from sleeve 28 to lever 34. Thus, the bearing ball 52 at the rear end of link 38 is pulled downwardly by this link to the lower end of sleeve 40. When a fish strikes the bait 26, the trailing portion 24 of the line is tensioned. This causes the elastic member 38 to elongate and simultaneously causes lever 34 to pivot upwardly and rearwardly about its pivot connection with rear end of upper link 36. Simultaneously therewith, since lever 34 is pivoting upwardly, the bearing ball 52 at the rear end of link 38 begins to slide upwardly in tube 40 as shown in FIG. 6.

The elastic member 38 has now stretched from the length a to the length b. However, as soon as the bearing ball 52 begins to approach the pivot point of lever 34 at ring 46, the elastic member 38 stretches more readily so that a substantially uniform tension on the portion 24 of the line will cause the lever 34 to pivot to a generally horizontal position such as shown in FIG. 7. When this occurs the elastic member 38 has stretched to the length c and the continued rearward tension on the portion 24 of the line will cause the intermediate portion of the line (the balls 60, 62 and the tube 64) to slide rearwardly out of sleeve 42 and thus release the line completely from lever 34. When this occurs the rod 20 immediately snaps back to its straightened position and indicates to the user that a fish has struck the bait. The fisherman may then reel in the line to a point wherein the upper ball 60 is adjacent the end of the rod 20, at which point the fish can be netted and brought into the boat.

In the arrangement illustrated in FIGS. 8 through 11 a sleeve 70 is attached to the downrigger cable 12 by means of a pair of stops 72. A bracket 74 is fixedly mounted on sleeve 70. Bracket 74 is interconnected with a lever 76 by means of upper and lower links 78, 80. Upper link 78 comprises a thin wire cable connected to plate 74 as at 82 and connected to the upper end of lever 76 as by a ring 84. Lever 76 comprises a sleeve 86 having a rib 88 extending lengthwise of the sleeve and securely fastened to the rear side of the sleeve. Rib 88 has a plurality of spaced openings 90 thereon. The lower link 80 comprises an elastic member which at its forward end is connected to plate 74 as at 92. At its rear end elastic member 80 is connected to one of the openings 90 by means of a swivel connector 94.

Sleeve 86 is formed with an elongate slot 96 on the rear face thereof. Slot 96 is circumferentially enlarged as at 98. The upper end of the enlarged portion 98 of the slot is spaced downwardly from the ring 84 which extends through sleeve 86.

An intermediate portion 100 of the line is adapted to be engaged with sleeve 86 by means of a plurality of bearing balls 102, 104, 106, 108 which are crimped to the line. The bearing balls 102, 108 are spaced apart along the intermediate portion 100 of the line a distance corresponding generally to the length of sleeve 86. The bearing balls 106, 108 are spaced apart a distance corresponding generally to the distance between the lower end of the enlarged portion 98 of the slot and the lower end of sleeve 86. With this arrangement the intermediate portion 100 of the line can be interengaged with lever 76 by aligning ball 108 with the enlarged portion 98 of slot 96 and ball 106 with the lower end of sleeve 86. The line can then be passed radially through slot 96 and then pulled upwardly to engage ball 108 against ring 84 and engage the balls 102, 104, 106 within the lower end portion of sleeve 86.

The arrangement illustrated in FIGS. 8 through 11 operates substantially the same as that shown in FIGS. 1 through 7. However, in the arrangement illustrated in FIG. 8 the required pull on the trailing portion 24 of the line to stretch member 80 and thus pivot lever 76 upwardly can be varied by selecting the desired one of the openings 90 for interengagement with the swivel connector 94. The closer the swivel connector 94 to the pivot axis of lever 76 at ring 84, the lesser the tension required to stretch elastic member 80. As in the previous embodiment illustrated, when a fish strikes the bait at the end of the portion 24 of the line, elastic member 80 is stretched, lever 76 pivots upwardly, and, as soon as it approaches a generally horizontal position, the rearward pull on the portion 24 will cause the intermediate portion 100 of the line to slide rearwardly within sleeve 86. As soon as ball 108 registers with the enlarged slot 98 the portion of the line connected therewith slips radially outwardly from slot 96 and the tension of the line from the rod now acts directly on ball 106 near the lower rear end of sleeve 86. This immediately increases the line leverage on sleeve 86 to pivot it to the fully horizontal position. Further rearward movement of the line causes the balls 102, 104, 106 to slide completely out of sleeve 86 and, thus, free the line entirely from lever 76.

In the arrangement illustrated in FIGS. 12 through 14 there is provided a bracket 110 having openings 112, 114 adjacent its upper and lower ends. These openings are provided for accommodating any suitable fasteners for attaching bracket 110 to a downrigger cable 12 in fixed position. Bracket 110 is connected with a lever 116 by upper and lower links 118, 120, respectively. Lever 116 comprises a sleeve 121 having a slot 122 extending the length thereof on the rear side of the sleeve. A rib 124 extending lengthwise along the front side of the sleeve is provided with a plurality of openings 126. The openings 126 serve substantially the same function as the openings 90 on the rib 88 of the embodiment illustrated in FIGS. 8 through 11. The upper link 118 is pivotally connected to the upper end of bracket 110 as at 128 and is pivotally connected, as by ring 130, with the upper end of sleeve 121. Ring 130 extends through sleeve 121. The lower link 120 comprises a spring clip 132 which resiliently engages a ferrule 134. Ferrule 134 is in turn connected with one of the openings 126 by a pair of interconnected rings 136. The intermediate portion 138 of the line has two bearings balls 140, 142 fixedly crimped thereon. These balls are spaced apart a distance corresponding generally to the length of sleeve 121. Between the two balls 140, 142 the line is threaded through a plastic tube 144.

The embodiment illustrated in FIGS. 12 through 14 operates generally in the same manner as those previously described, except that when a fish strikes the bait at the end of the portion 24 of the line, the resulting rearward pull at the lower end of lever 116 causes the spring clip 132 to disengage the ferrule 134, thus permitting lever 116 to pivot freely upwardly to the horizontal position. When lever 116 pivots upwardly to the horizontal position a continued rearward pull on the portion 24 of the line will cause the intermediate portion 138 of the line to slip rearwardly out of sleeve 116 and, thus, free the line completely from the lever.

In the arrangement shown in FIGS. 15 through 17 a rigid bracket 150 is connected to a sleeve 152 secured to the downrigger cable 12 by means of stops. Bracket 150 has an upward rearwardly projecting arm 156 and a lower rearwardly projecting arm 158. The under side of arm 156 is formed with a vertical socket 160 projecting downwardly from adjacent the rear end of the arm. The rear end of the lower arm 158 comprises a magnet 162. In the arrangement shown in FIGS. 15 through 17 the lever comprises a rod 164 the upper end of which is adapted to be loosely seated within socket 160. The lower portion of the rod has a magnetic disc 166 secured thereto. The rod is dimensioned such that when the upper end thereof is seated in socket 160 the disc 166 is adapted to adhere to the magnet 162. The portion 18 of the fishing line is secured to the upper end of rod 164 and the portion 24 of the line is attached to the lower end of rod 164 below disc 166.

With the above described arrangement, when a fish strikes the bait at the end of the trailing portion 24 of the line disc 166 becomes separated from magnet 162 and rod 164 pivots upwardly within socket 160. Socket 160 is oversized relative to the diameter of rod 164 to permit this pivotal action. When the rod 164 assumes a generally horizontal position, the upper end of the rod completely disengages from within socket 160 and the fishing line is, therefore, completely separated from bracket 150.

In each of the embodiments illustrated it will be noted that the intermediate portion of the line is connected to or comprises a lever which, in the normal trolling position, extends generally vertically with the upper end of the lever pivotally connected to a bracket which is attached to the downrigger cable. The pivotal connection of the lever with the bracket is such that tension in the portion 18 of the line merely produces an upward pull on the bracket itself but does not tend to pivot the lever or disengage the line from the release mechanism. Thus, the line is released from the bracket only when the lever pivots upwardly in response to a fish striking the line and is in no way influenced by the amount of water drag on the portion of the line extending down from the fishing rod to the bracket.

I claim:
1. A device for releasably connecting a fish trolling line to an underwater downrigger device comprising a bracket, means for attaching the bracket to the downrigger device so that the bracket remains in a relatively fixed position with respect to the downrigger device while trolling, a generally vertically extending lever located rearwardly of said bracket relative to the trolling direction, said lever being connected at its upper end to said bracket for pivotal movement rearwardly and upwardly in a vertical plane, means connecting the lower end of said lever to said bracket and yieldably resisting said pivotal movement, means for releasably connecting an intermediate portion of a fishing line extending downwardly from a fishing rod with said bracket so that the bait trailing end portion of the line extends horizontally rearwardly when trolling, said releasable connecting means comprising a first means connecting the portion of the line extending down from the rod to the upper end of the said lever and a second means connecting the bait trailing end portion of the line to the lower end of said lever so that a rearward pull of predetermined strength on the bait trailing portion of the line overcomes said yieldable connecting means and causes said lever to pivot upwardly thereby releasing said line from said bracket in response to said upward pivotal movement of said lever to a generally horizontal position.

2. A device as called for in claim 1 wherein said connection between the upper end of said lever and bracket comprises a permanent pivot connection therebetween and said yieldable connection means comprises a resiliently yieldable member connecting the lower end of said bracket and the lower end of said lever, said first and second connection means being adapted to release the line from said lever in response to pivotal movement of said lever to a generally horizontal position.

3. A device as called for in claim 2 wherein said lever is connected to said bracket by means of a pair of generally parallel upper and lower links extending rearwardly from said bracket to said lever.

4. A device as called for in claim 3 wherein said links form a generally vertical parallelogram linkage between said lever and bracket.

5. A device as called for in claim 3 wherein the lower link comprises a resiliently elastic member which is adapted to elongate and thereby permit said pivotal movement of the lever in response to said rearward pull on the bait trailing end portion of the line.

6. A device as called for in claim 3 wherein said lower link comprises two resiliently connected sections adapted to be released and separated from one another in response to said rearward pull.

7. A device as called for in claim 3 including means for adjusting the position of the connection between said lever and the lower link in a vertical direction.

8. A device as called for in claim 3 wherein the rear end of the lower link is connected with the lower end portion of the lever for vertical sliding movement thereon whereby upon initiation of upward pivotal movement of said lever in response to a rearward pull on the bait trailing end portion of the line, the rear end of said lower link slides upwardly on said lever to facilitate further pivotal upward movement thereof.

9. A device as called for in claim 2 wherein said lever comprises a sleeve having a slot extending lengthwise thereof along its rear side, said intermediate portion of the fishing line extending lengthwise through said sleeve and having means thereon engaged within said sleeve for fixedly securing said intermediate portion of the line against vertical upward displacement in the sleeve when the lever extends generally vertically, said last-mentioned means being adapted in response to pivotal movement of said lever to said generally horizontal position, to shift rearwardly in the sleeve and permit the adjacent portion of the line to pass radially through said slot out of engagement with said sleeve.

10. A device as called for in claim 9 wherein said securing means comprises abutment means on the intermediate portion of the line, abutment engaging means at the upper end of the sleeve to prevent displacement of the line in a direction upwardly of the sleeve, said abutment means being slidable downwardly in the sleeve in response to upward pivotal movement of the sleeve to release the line from said sleeve through said slot.

11. A device as called for in claim 10 wherein said slot has a circumferentially enlarged portion spaced at least slightly downwardly from said abutment engaging means at the upper end of the sleeve, said abutment means being adapted to pass radially through said enlarged portion of the slot when in axial registration therewith.

12. A device as called for in claim 11 including second abutment means on the intermediate portion of the line disposed within and adjacent the lower end portion of the sleeve, said second abutment means being slidable in said sleeve with said line and having a cross section greater than the width of said slot so as to be incapable of being displaced radially through said slot, said second abutment means being spaced axially from said first abutment means such that when the line is displaced axially within the sleeve to a position wherein the first abutment means register axially with the enlarged portion of the slot said second abutment means are located outwardly beyond the lower end of said sleeve.

13. A device as called for in claim 1 wherein said lever is permanently connected to said line at its upper and lower ends.

14. A device as called for in claim 13 wherein said pivotal connection comprises a downwardly opening socket in said bracket adjacent the upper end thereof, the upper end of said lever being seated in said socket and adapted to be displaced therefrom in response to said upward pivotal movement of the lever.

15. A device as called for in claim 14 wherein the lower end portion of said lever is connected to the lower end of said bracket so as to be released therefrom in response to said rearward pull on the trailing bait end portion of the line.

16. A device as called for in claim 15 wherein the lower end of said lever is secured to the lower end of said bracket by means of a magnet.

* * * * *